US008615788B2

(12) United States Patent
Berger et al.

(10) Patent No.: US 8,615,788 B2
(45) Date of Patent: Dec. 24, 2013

(54) METHOD AND APPARATUS FOR SCALABLE INTEGRITY ATTESTATION IN VIRTUALIZATION ENVIRONMENTS

(75) Inventors: Stefan Berger, Hawthorne, NY (US); Ramon Caceres, New York, NY (US); Kenneth Alan Goldman, Hawthorne, NY (US); Ronald Perez, Yorktown Heights, NY (US); Reiner Sailer, Hawthorne, NY (US); Deepa Srinivasan, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 704 days.

(21) Appl. No.: 12/539,912

(22) Filed: Aug. 12, 2009

(65) Prior Publication Data
US 2011/0040957 A1   Feb. 17, 2011

(51) Int. Cl.
G06F 7/04   (2006.01)
G06F 9/00   (2006.01)
G06F 12/14   (2006.01)
G06F 15/177   (2006.01)
G06F 17/30   (2006.01)
H04L 9/32   (2006.01)

(52) U.S. Cl.
USPC .......... 726/2; 726/16; 726/17; 726/21; 718/1; 713/1; 713/155; 713/156; 713/176

(58) Field of Classification Search
USPC ......... 713/1, 155, 156, 176; 718/1; 726/2, 16, 726/17, 21
See application file for complete search history.

(56) References Cited

U.S. PATENT DOCUMENTS

| 7,313,679 | B2 * | 12/2007 | Ranganathan | 713/1 |
| 7,552,419 | B2 * | 6/2009 | Zimmer et al. | 717/121 |
| 7,930,733 | B1 * | 4/2011 | Iftode et al. | 726/5 |
| 2003/0074548 | A1 * | 4/2003 | Cromer et al. | 713/1 |
| 2003/0188113 | A1 * | 10/2003 | Grawrock et al. | 711/156 |
| 2005/0132031 | A1 * | 6/2005 | Sailer et al. | 709/223 |
| 2005/0262571 | A1 * | 11/2005 | Zimmer et al. | 726/27 |
| 2007/0067617 | A1 * | 3/2007 | Tarkkala | 713/2 |
| 2007/0226505 | A1 * | 9/2007 | Brickell | 713/176 |
| 2007/0260545 | A1 * | 11/2007 | Bade et al. | 705/51 |

OTHER PUBLICATIONS

Sailer et al., "Design and Implementation of a TCG-based Integrity Measurement Architecture", Usenix Security Symposium, Aug. 11, 2004.

* cited by examiner

Primary Examiner — Mark Connolly
(74) Attorney, Agent, or Firm — Cahn & Samuels, LLP

(57) ABSTRACT

A computer implemented method for logging extensions to platform configuration registers inside a trusted platform module instance is provided. A request to extend the current state of at least one of a plurality of platform configuration register is received. At least one platform configuration register within the trusted platform module instance is extended. The extension of the at least one platform configuration register is logged inside the trusted platform module instance as a logged entry by storing at least a tuple of platform configuration register indexes and hash values used for extending the platform configuration register. Information about new entries in the consolidated logs can be retrieved by polling or by subscribing to events that are automatically generated. A report of an extend operation and its logged hash value is sent to subscribers interested in receiving notifications of extend operations on a set of PCR registers.

18 Claims, 4 Drawing Sheets

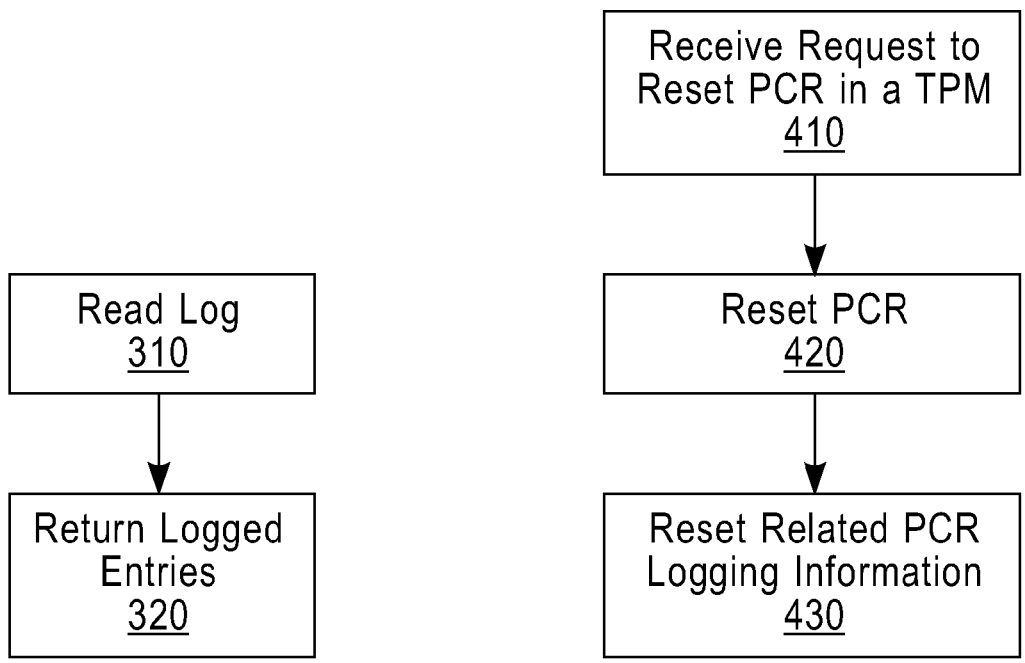
FIG. 3
FIG. 4
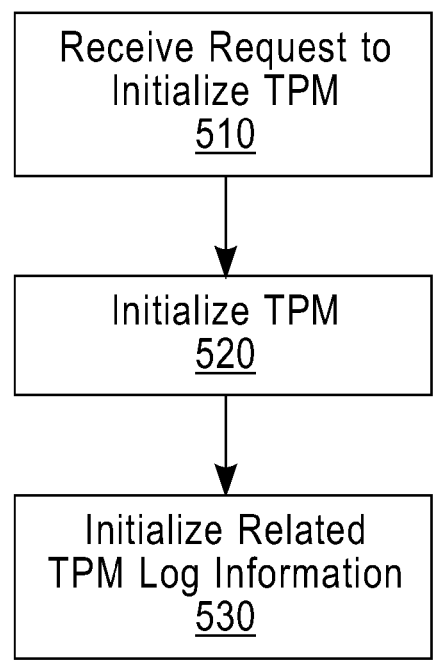
FIG. 5

US 8,615,788 B2

METHOD AND APPARATUS FOR SCALABLE INTEGRITY ATTESTATION IN VIRTUALIZATION ENVIRONMENTS

I. FIELD OF THE INVENTION

This invention relates to a method and system for attestation in virtual environments

II. BACKGROUND OF THE INVENTION

Trusted Computing Group (TCG) use cases provide the means for remote parties to attest to the software state of a computer system/platform. The software state includes measurements of the software chain and might include configuration files used to initialize or customize a software module. The attestation method, according to the TCG, implements a transitive trust chain architecture where each layer of software measures the next layer before executing it. The procedure begins with the Core Root of Trust for Measurement (CRTM) that measures parts of the firmware of the machine (BIOS on a PC) before it starts executing it. Subsequently, each layer in turn measures the next-to-be-executed layer before calling it. Digests of these measurements are accumulated through a one-way hash function, also known as a extend operation, into Platform Configuration Registers (PCRs) contained in the Trusted Platform Module (TPM). The names of measured pieces of software and their measurement values are appended to a measurement log.

During the remote attestation process, a set of PCRs is quoted, digested, and digitally signed with a trusted Attestation Identity Key (AIK) held inside the TPM. The remote party/system receives the quote, public AIK key and the certificate of the AIK and validates the AIK certificate, which has previously been issued by a trusted privacy certificate authority. The remote party/system also verifies the digital signature of the quote and the integrity of the list of measurements by comparing it to the PCR state included in the quote. Once the list of measurements is found to be trusted, the remote system uses it to determine whether the attested system is running trusted software.

Currently, with a non-virtualized platform, a system's single TPM holds the result of all individual measurements in its PCR registers. The platform also maintains a list of measurements in main memory. Furthermore, the platform runs an attestation service process for remote parties/systems to connect to and request the reporting of measurements.

Similarly, in a virtualized environment, each virtual machine (VM) has a corresponding TPM. To attest to a VM, the remote party must know how to connect to it, and the VM must be running an attestation service process.

Further, each VM's TPM contains common early measurements such as those of the firmware (BIOS on a PC), master boot record, and the virtual machine monitor (VMM) following the aforementioned TCG transitive trust architecture. A remote party attesting to more than one VM may receive duplicate measurements if the VMs all run the same software.

In addition, a remote party only receives measurements reflecting a single point in time. Therefore, the remote party must continuously poll each VM if it wants to detect new entries in the measurement log.

These attributes limit attestation in cases where a VM is not aware of the attestation process or where the remote party cannot locate the server. Further, they do not scale well in cases where a platform hosts many VMs or where a remote party wants to continuously monitor the state of the software inside multiple VMs.

A data center typically hosts many virtualized platforms where on each platform many VM's may be running simultaneously. For trust establishment purposes, each one of the operating systems that is running inside a VM may have been instrumented to take measurements of executables that are started and libraries that link against these applications or driver modules that are loaded into the kernel. Each of the measurements is accumulated in platform configuration registers (PCRs) of a virtual TPM instance associated with a VM.

III. SUMMARY OF THE INVENTION

A computer implemented method for logging extensions to platform configuration registers inside a trusted platform module instance is provided. A request to extend the current state of at least one of a plurality of platform configuration register is received. At least one platform configuration register within the trusted platform module instance is extended. The extension of the at least one platform configuration register is logged inside the trusted platform module instance as a logged entry by storing at least a tuple of platform configuration register indexes and hash values used for extending the platform configuration register. The logged entry is available for polling or an event driven subscription.

As used herein "substantially", "relatively", "generally", "about", and "approximately" are relative modifiers intended to indicate permissible variation from the characteristic so modified. They are not intended to be limited to the absolute value or characteristic that it modifies but rather approaching or approximating such a physical or functional characteristic.

In the detailed description, references to "one embodiment", "an embodiment", or "in embodiments" mean that the feature being referred to is included in at least one embodiment of the invention. Moreover, separate references to "one embodiment", "an embodiment", or "in embodiments" do not necessarily refer to the same embodiment; however, neither are such embodiments mutually exclusive, unless so stated, and except as will be readily apparent to those skilled in the art. Thus, the invention can include any variety of combinations and/or integrations of the embodiments described herein.

IV. BRIEF DESCRIPTION OF THE DRAWINGS

FIG. 3 shows a flow chart of a process for reading the measurement log in accordance with an aspect of the invention.

FIG. 4 illustrates a flow chart for a process of resetting platform configuration registers in accordance with an aspect of the invention.

FIG. 5 depicts a process of a TPM initialization request in accordance with an aspect of the invention.

V. DETAILED DESCRIPTION OF THE DRAWINGS

Figure 1:
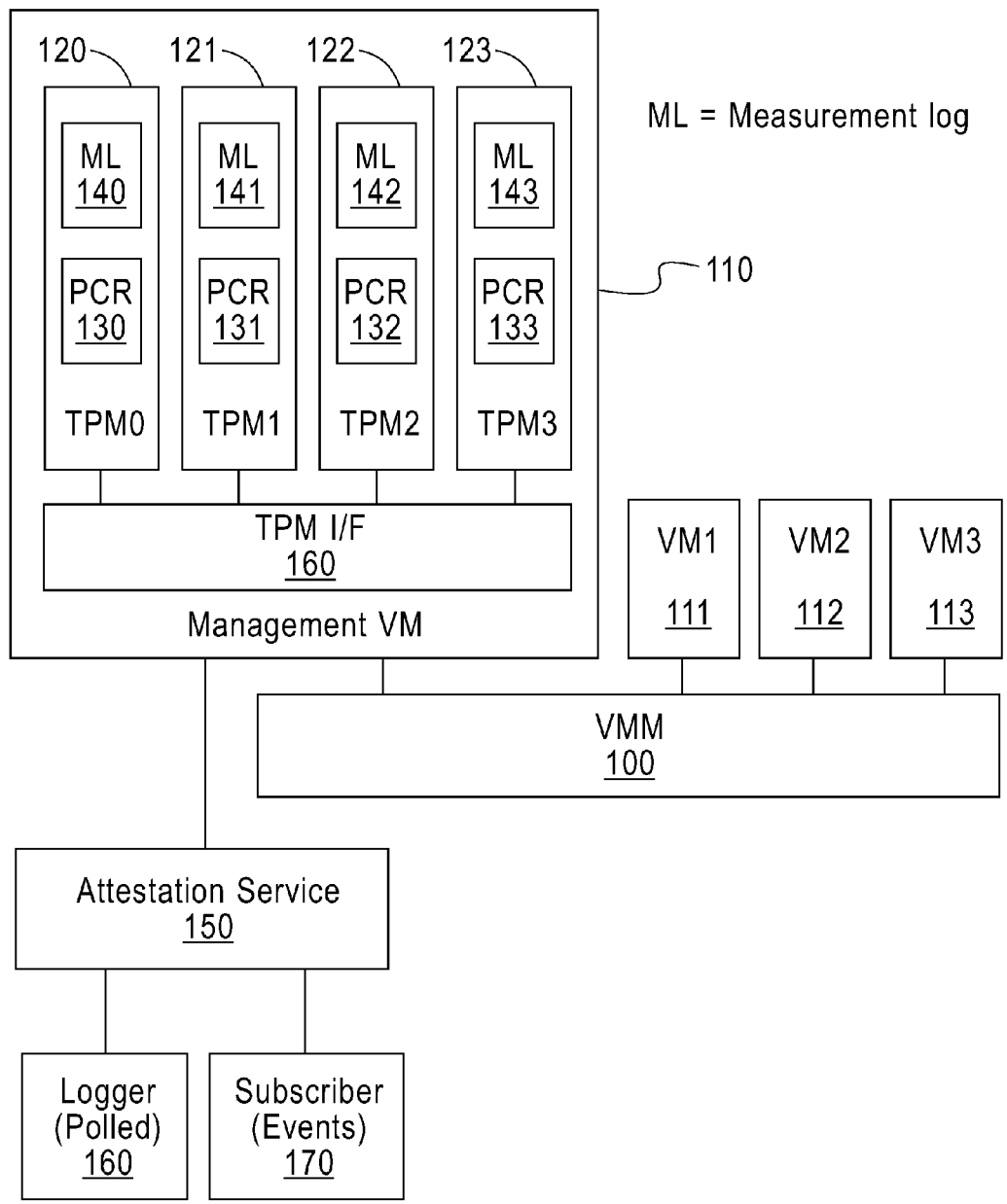
FIG. 1 illustrates a block diagram of a computing system in accordance with an embodiment of the invention.

As will be appreciated by one of ordinary skill in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer-usable code embodied in the medium.

Any combination of one or more computer usable computer readable mediums(s) may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EEPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer readable medium may be any medium that can contain, store, communicate, propagate, or transport the program for use by or in connection with the instruction execution system, apparatus, or device. The computer-usable medium may include a propagated data signal with the computer-usable program code embodied therewith, either in a baseband or as part of a carrier wave. The computer usable program code may be transmitted using any appropriate medium, including but not limited to wireless, wire line, optical fiber, cable, RF, etc.

Computer code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand—alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring now to FIG. 1, it illustrates a computing system showing an exemplary architecture that implements the present invention.

Virtual machine monitor (VMM) 100 provides a basic software structure over which virtual machines (VMs) 110, 111, 112, and 113 run. In an exemplary embodiment, VMM 100 communicates directly with the computing hardware. In an alternate embodiment, VMM 110 communicates with an underlying host operating system that in turn communicates with the computing hardware.

In accordance with an aspect of the invention, VMs 111, 112, and 113 are standard, non-privileged machines running any desired application workload. VM 100 is a privileged management machine that provides services to the other VMs. In an alternate embodiment, VM 110 is included in VMM 100.

Each VM 110, 111, 112, and 113 has an associated virtual trusted platform module (VTPM) 120. 121. 122. and 123 that implements the standard Trusted Computing Group (TCG) command set. As such, each TPM has a set of Platform Configuration Registers (PCRs), respectively 130, 131, 132, and 133, as defined by the TCG. While FIG. 1 shows the VTPMs contained in the management VM 110, they could alternately be included in the VMM 100

Each VTPM 120, 121, 122, and 123 also has an associated measurement log 140, 141, 142, and 143 that are an addition to the standard TCG command set. The measurement log holds additional information associated with every standard TCG extend to a PCR. This information is at least the PCR index and extend hash. It could additionally include other information, such as the VTPM instance number, an incrementing sequence number, or a time stamp.

The TPM interface (TPMIF) 160 offers an interface to communicate with the VTPMs. In an exemplary embodiment, the TPMIF 160 is part of the management VM 110, but could alternately be included in the VMM 100. TPMIF 160 communicates standard TPM commands and responses to the VTPMs 120, 121, 122 and 123. TPMIF 160 communicates the additional, non-standard commands to write the measurement logs. TPMIF 160 communicates with the VTPMs responsive to an extend command, to optionally specify which of a subset of PCRs are logged.

The TPMIF 160 offers an interface to the attestation service 150 that allows a remote party such as logger 180 to read one or more measurement logs 140, 141, 142 and 143. In one embodiment, logger 180 reads one or more measurement logs 140, 141, 142 and 143 periodically, a process known as polling. In an alternate embodiment, logger 180 uses other algorithms to read measurement logs, such as during times of light load, in response to a high risk workload, etc.

The TPMIF 160 offers an interface to the attestation service 150 that allows a remote party such as subscriber 170 to subscribe to measurement log events. An event might be any change to the log, or it might be a subset of changes such as changes to a specified set of VTPMs or a specified set of PCRs. The subscriber 170, once subscribed, would receive extend information as the extend occurs through the attestation service 150.

In keeping with the invention, the attestation service 150 connects to a single TPMIF 160 through management VM 110, and this single TPMIF 160 permits communication with multiple VTPMs. Neither the logger 180 nor the subscriber 170 need connect to individual VTPMs. Thus, TPMIF 160 aggregates and returns measurement log information from all VTPMs 120, 121, 122 and 123.

Figure 2:
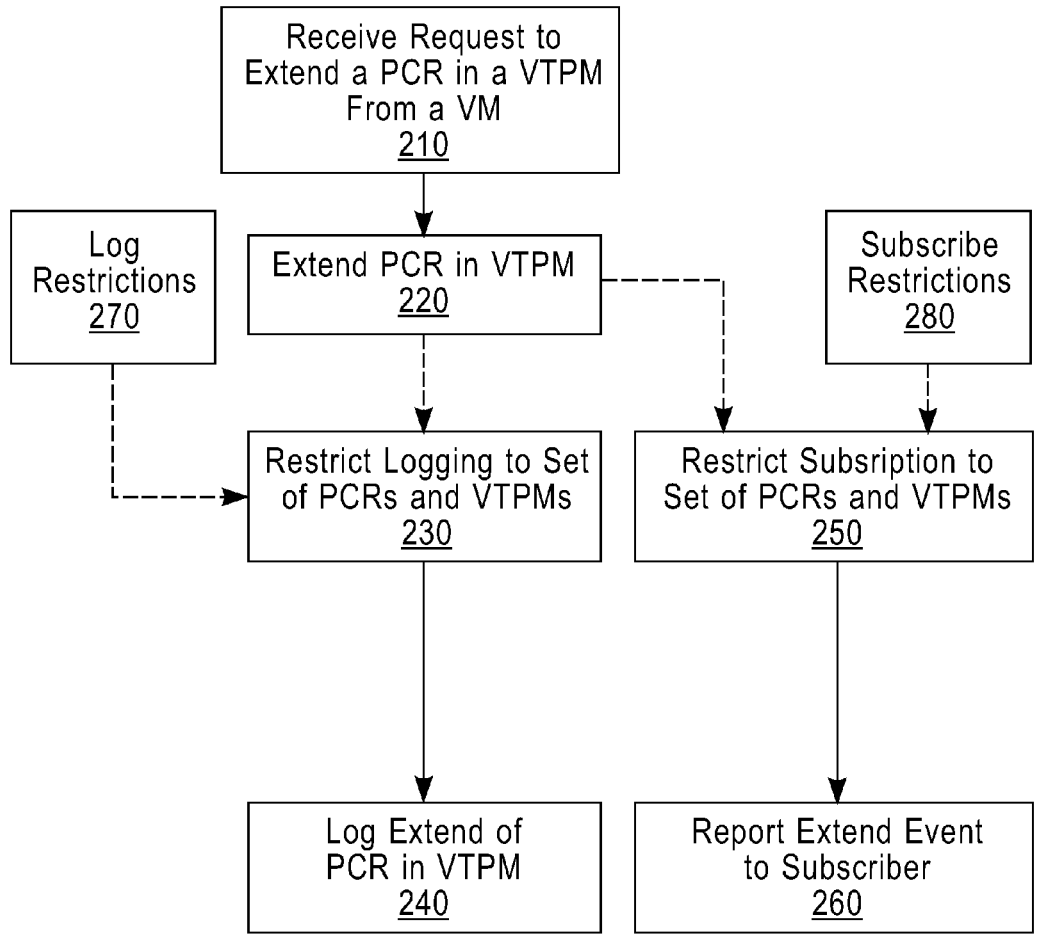
FIG. 2 depicts a flow chart of a method in accordance with the invention.

FIG. 2 is a flow chart depicting method in accordance with the invention. In step 210, a VTPM receives a request to extend a PCR from a VM. In step 220, the standard TCG extend operation is performed. In some embodiments, logging restrictions are set. If logging restrictions are set, step 230 decides whether to log. If the log should occur, step 240 logs the extend information, e.g., extend hash and PCR index, to a measurement log associated with the TPM. In some embodiments, step 240 includes storing at least a tuple of platform configuration indexes and hash values used for the TCB extend operation. In other embodiments, extend information is automatically logged responsive to performance of the TCG extend operation.

Step 220 also connects to step 250, where subscriber restrictions similar to logging restrictions are processed. If the subscriber event should be processed, step 240 reports extend information to the subscriber.

It should be understood that the log restrictions and subscriber restrictions may be the same or different, and that there may be no subscriber, one subscriber, or more than one subscriber connected to receive notification about TPM extend operations. Preferred restrictions could be based on the VTPM instance or the PCR index. For the subscriber an additional preferred restriction is a limit to the number of extend notifications that the system could send to a subscriber within a specified time interval.

Optional step 270 permits the sender to add, change, or remove logging restrictions. The restrictions may be stored in either the TPMIF 160 or a VTPM instance. When an extend operation 220 is performed, the restrictions are processed in step 230.

Optional step 280 permits the sender to add, change, or remove subscription restrictions. The restrictions may be stored in either TPMIF 160 or in one or more VTPM instances 120, 121, 122 and 123. When an extend operation 220 is performed, the restrictions are processed in step 250.

FIG. 3 is a flow chart indicating the steps associated with reading the measurement log. A request to read the log is received in step 310, and the system returns the requested log entries in step 320. The request might be for all or a subset of the entries, and that subset might be restricted by TPM instance, a PCR index or a set of PCRs, a time interval, or a range of entries.

FIG. 4 is a flow chart indicating the steps associated with a PCR reset request. In a preferred implementation, the request 410 is to reset one PCR in one TPM instance. In step 420, the standard TCG PCR reset is performed. In step 430, information associated with the TPM instance and PCR index is removed from the measurement log and the measurement log is thereby reset.

FIG. 5 is a flow chart indicating the steps associated with a TPM initialization request. In a preferred implementation, the request 510 is to reset one TPM instance. In step 520, the standard TCG TPM initialization is performed. In step 530, information associated with the TPM instance is removed from the measurement log thereby initializing an empty log.

Figure 6:
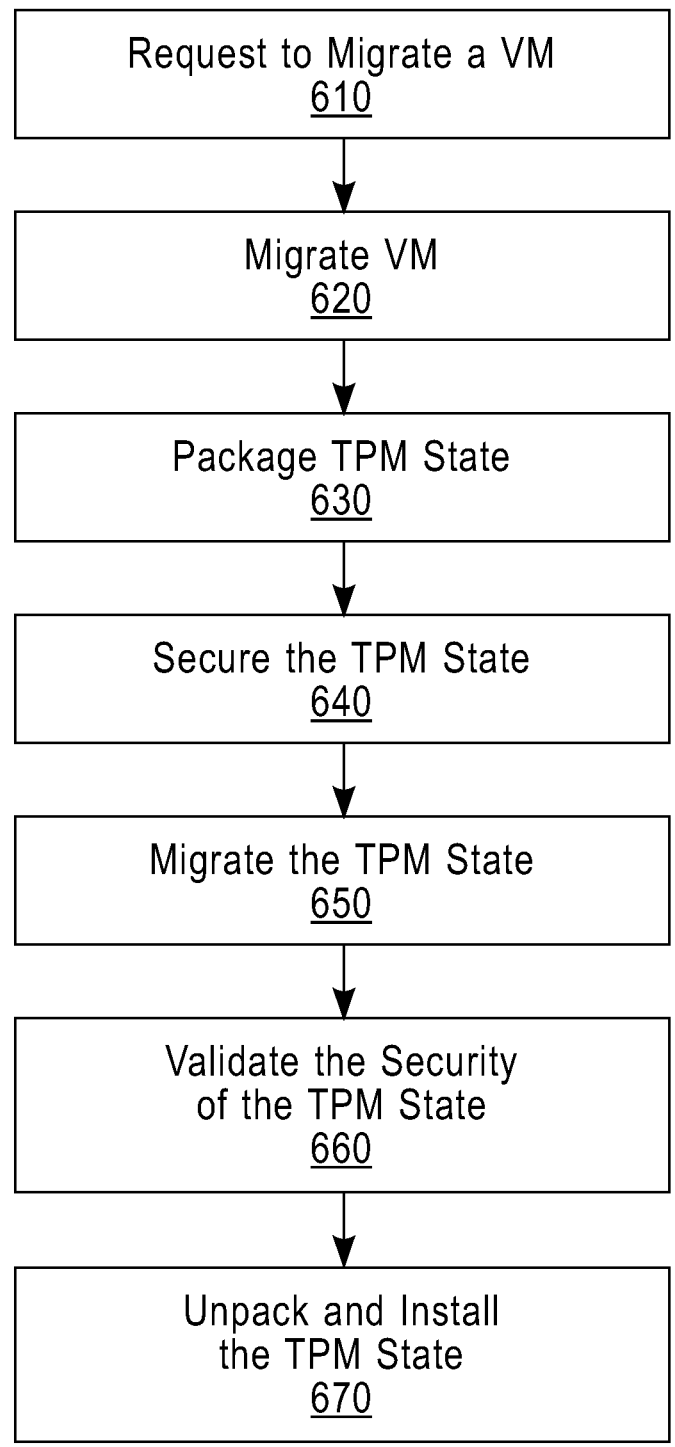
FIG. 6 shows a process for migrating a TPM instance in accordance with an aspect of the invention.

Sometimes it is desirable to move or migrate a VM from one physical machine to another. This might be done, for example, if the machine hosting the VM becomes overloaded, starts to fail, or even if the machine is shut down to save power. When a VM is migrated, it is desirable to also move everything associated with its state, including its associated VTPM. For a VTPM, the migration to another physical machine should be done securely to make it difficult for an attacker to change data in transit. FIG. 6 is a flow chart indicating the steps associated with migrating a TPM instance. When a VM is migrated from a VMM on one platform to a VMM on another platform, all VM state must be migrated. This state includes information such as the standard TCG volatile and nonvolatile TPM state, and the non-standard measurement log that it the subject of this invention.

A request to migrate a VM is received in step 610. In step 620, the VM is migrated. The procedure to migrate a VM is well known and implemented in standard products. Step 630 packages the VTPM state, including, as stated, standard and non-standard states as well as the logged entries In step 640, the VTPM state is secured against attacks during transit. The step 640 of securing may include encrypting the state so that private data cannot be viewed, adding integrity data so that data cannot be altered, and adding a nonce or sequence number to prevent replacement with an older state. In step 650, the VTPM state is migrated to the new platform. In a preferred embodiment, this migration is performed over a computer network, but other means such as removable non-volatile media are envisioned. In step 660, the security features added in step 640 are verified. In step 670 the VTPM state is unpacked into the target VTPM in a reversal of step 630.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially(?) concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The exemplary and alternative embodiments described above may be combined in a variety of ways with each other. Furthermore, the steps and number of the various steps illustrated in the figures may be adjusted from that shown.

Although the present invention has been described in terms of particular exemplary and alternative embodiments, it is not limited to those embodiments. Alternative embodiments, examples, and modifications which would still be encompassed by the invention may be made by those skilled in the art, particularly in light of the foregoing teachings.

We claim:

1. A computer implemented method for logging extensions to platform configuration registers inside a trusted platform module instance, the computer implemented method comprising:
   receiving a request to extend the current state of at least one of a plurality of platform configuration register;
   extending the at least one platform configuration register within the trusted platform module instance;
   logging the extension of the at least one platform configuration register inside the trusted platform module instance as logged entries by storing at least a tuple of platform configuration register indexes and hash values used for extending the platform configuration register; and
   limiting a rate of reporting to a maximum number of notifications sent from the trusted platform module within a certain time interval.

2. The computer implemented method of claim 1, further comprising:
   restricting the logging to a selected set of the plurality of platform configuration registers.

3. The computer implemented method of claim 1, further comprising:
   providing read access to the logged entries.

4. The computer implemented method of claim 3, further comprising:
   restricting the logged entries to be read to a selected subset of logged entries.

5. The computer implemented method of claim 1, further comprising:
   aggregating multiple trusted platform module instances in a trusted platform interface module.

6. The computer implemented method according to claim 5, further comprising:
   providing read access to logged entries for said aggregated trusted platform module instances.

7. The computer implemented method of claim 1, further comprising resetting at least one of the plurality of platform configuration registers such that all logging information related to the at least one platform configuration register is cleared.

8. The computer implemented method of claim 1, further comprising initializing the trusted platform module instance such that the trusted platform module instance initializes an empty log.

9. The computer implemented method of claim 1, further comprising securely packaging the logged entries responsive to a request to migrate the state of the trusted platform module instance to another trusted platform module instance.

10. A computer implemented method for reporting extensions to platform configuration registers inside a trusted platform module instance, the computer implemented method comprising:
   receiving a request to extend a current state of at least one of a plurality of platform configuration registers;
   extending the at least one platform configuration register within the trusted platform module instance;
   reporting the extension of the specified platform configuration register inside the trusted platform module instance to subscribers by reporting at least a tuple of platform configuration register indexes and hash values used for the extension;
   automatically reporting extend information from the platform module instance to a subscriber; and
   limiting a rate of reporting to a maximum number of notifications sent from the trusted platform module within a certain time interval.

11. The computer implemented method of claim 10, further comprising:
   subscribing to a selected set of the plurality of platform configuration registers and restricting the reporting to the selected set of platform configuration registers.

12. The computer implemented method of claim 10 further comprising aggregating multiple trusted platform module instances in a trusted platform interface module.

13. The computer implemented method of claim 12 further comprising reporting entries from the aggregated trusted platform module instances to a subscriber.

14. A computer implemented method for reporting extensions to platform configuration registers inside a trusted platform module instance, the computer implemented method comprising:
   receiving a request to extend a current state of at least one of a plurality of platform configuration registers;
   extending the at least one platform configuration register within the trusted platform module instance;
   reporting the extension of the specified platform configuration register inside the trusted platform module instance to subscribers by reporting at least a tuple of platform configuration register indexes and hash values used for the extension; and
   limiting a rate of reporting to a maximum number of notifications sent from the trusted platform module within a certain time interval.

15. The computer implemented method of claim 14, further comprising:
   subscribing to a selected set of the plurality of platform configuration registers and restricting the reporting to the selected set of platform configuration registers.

16. The computer implemented method of claim 14 further comprising automatically reporting extend information from the platform module instance to a subscriber.

17. The computer implemented method of claim 14 further comprising aggregating multiple trusted platform module instances in a trusted platform interface module.

18. The computer implemented method of claim 17 further comprising reporting entries from the aggregated trusted platform module instances to a subscriber.

* * * * *